United States Patent [19]

Adams

[11] E Patent Number: Re. 32,807

[45] Reissued Date of Patent: Dec. 27, 1988

[54] FAMILY TOILET SEAT

[75] Inventor: Harold D. Adams, Greenville, Miss.

[73] Assignee: Adams Safety Seats, Inc., Greenville, Miss.

[21] Appl. No.: 12,311

[22] Filed: Feb. 9, 1987

Related U.S. Patent Documents

Reissue of:

[64] Patent No.: 4,461,046
Issued: Jul. 24, 1984
Appl. No.: 436,275
Filed: Jan. 3, 1983

[51] Int. Cl.[4] ..... A47K 13/00

[52] U.S. Cl. ..... 4/235; 4/239

[58] Field of Search ..... 4/235, 239, 240, 242, 4/241, 237, 236

[56] References Cited

U.S. PATENT DOCUMENTS

| | | | |
|---|---|---|---|
| 903,596 | 11/1908 | Martin et al. | 4/235 |
| 1,334,137 | 3/1920 | Delany | 4/239 |
| 2,155,577 | 4/1939 | Zaio | 4/235 |
| 2,219,643 | 10/1940 | Zaio | 4/235 |
| 2,461,160 | 2/1949 | Joyce | 4/235 |
| 2,645,784 | 7/1953 | Blackburn | 4/235 |
| 2,692,992 | 11/1954 | Thimmes et al. | 4/235 |
| 2,808,874 | 10/1957 | Liebling | 4/235 X |
| 3,609,775 | 10/1971 | Leiter et al. | 4/235 X |

FOREIGN PATENT DOCUMENTS

| | | | |
|---|---|---|---|
| 0571413 | 3/1959 | Canada | 4/235 |

*Primary Examiner*—Henry K. Artis
*Attorney, Agent, or Firm*—Fleit, Jacobson, Cohn & Price

[57] ABSTRACT

A multiple toilet seat assembly of the type that permit the selective use of an appropriate sized opening for use by a particular individual e.g. an adult or a child and which affords greater safety due to the elimination of side-to-side lateral movement and more sanitary in that any wetting upon the child seat is prevented from coming in contact with the adult seat.

7 Claims, 2 Drawing Sheets

FAMILY TOILET SEAT

Matter enclosed in heavy brackets [ ] appears in the original patent but forms no part of this reissue specification; matter printed in italics indicates the additions made by reissue.

This invention relates to improvements in multiple toilet seat units and provides for the selective use of an appropriate size seat for a particular individual, e.g. an adult or a child, as described in the present specifiction and illustrated in the attached drawings.

The object of my invention is to provide an improved closet seat wherein the opening may be varied in size in order to adapt the [some] *same* for use by both adults and small children in such a manner so as to keep the seats from sliding laterally a side-to-side in the horizontal plane.

A further object of my invention is to provide an improved closet seat which is more sanitary because liquid from the childs seat is prohibited from coming in contact with the adult closet seat.

Another object of my invention is to provide a [faster] *safer* closet seat by eliminating side-by-side movement of the seat assembly particularly when being climbed upon or used by a child.

Another object of my invention is to provide a multiple toilet seat unit which is inexpensive to manufacture, durable in structure and efficient in operation.

Still another object of my invention is a multiple toilet seat unit having a child's toilet seat incorporated therein and being as essentially concealed when not in use.

Additional objects and advantages of the invention will be readily apparent from the reading of the following description of the multiple toilet seat assembly, and reference to the accompanying drawings thereof, wherein.

A typical multiple toilet seat assembly includes a cover, an adult or conventional toilet seat and a child seat intermediate the cover and the adult seat and sharing a common hinge assembly at the rear section thereof.

My invention differs from the typical multiple toilet seat assembly in that I have provide each seating component with an extended lip portion designed to protrude into the lower opening to thereby prevent lateral movement of the seats when in the in-use or operative position. The multiple toilet seat assembly, as illustrated, is preferably made from a moulded plastic material such as plastic fiber-glass or padding, as is common in the art.

Referring in detail to the drawings, a conventional toilet bowl G is shown. The multiple toilet seat assembly, attached thereto, having a lid or cover A, a child seat B and an adult seat C. Note that the child seat has composite therewith an extended lip portion H contoured to fit snuggly inside of the opening of the adult seat C. The adult seat C has composite therewith an extended lip portion J which extends down into the toilet bowl opening and fits snuggly therein. The function of the respective lips portion H, J is to prevent the corresponding seat from sliding from side to side in the lateral direction, thus making it safer to sit on particularly when used by children.

Figure 1:
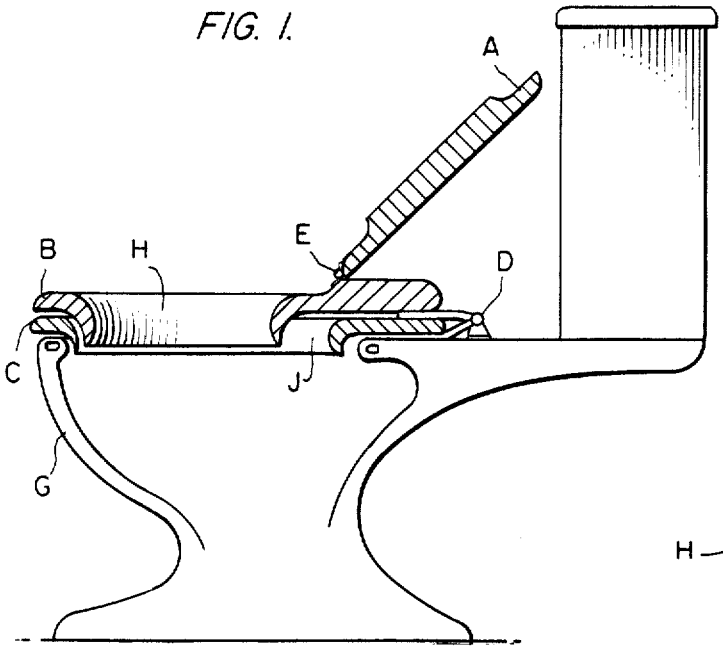
FIG. 1 is a side cutaway cross-sectional view of the multiple toilet seat assembly with the child's toilet seat in the in-use position.
Figure 2:
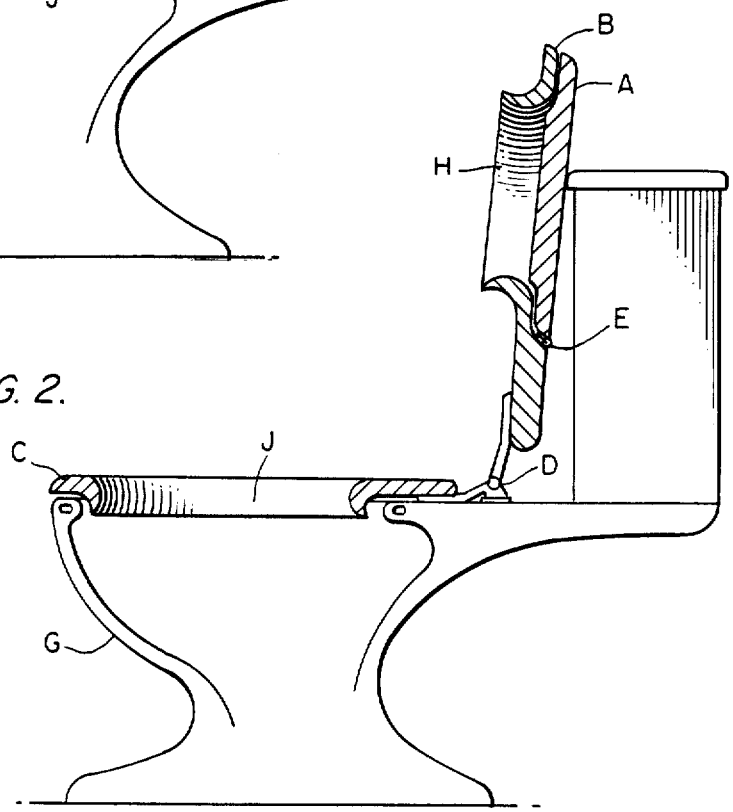
FIG. 2 is a side cutaway cross-sectional view of the multiple toilet seat assembly with the adult toilet seat in the in-use position.
Figure 3:
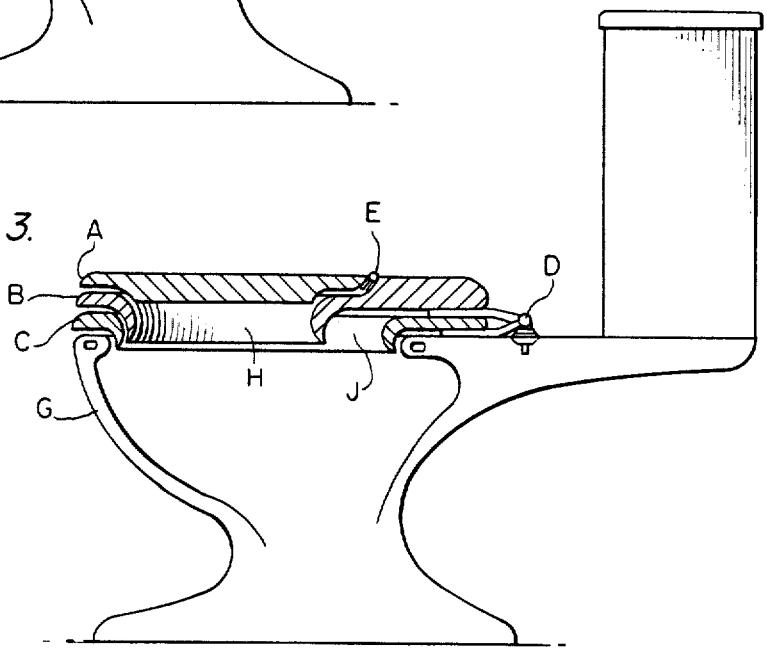
FIG. 3 is a side cutaway cross sectional view of the multiple toilet seat assembly in the closed position.
Figure 4:
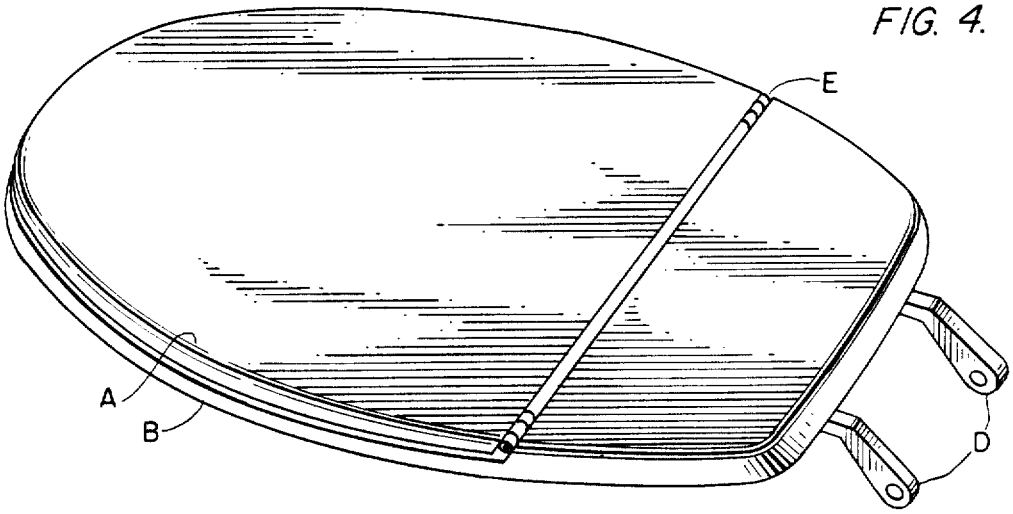
FIG. 4 is a perspective view of the child toilet seat and cover assembly in the closed position.

In the preferred embodiment *shown in FIGS. 1–3,* the cover A is attached to the child seat by way of a hinge connection E whereas the cover is of a length substantially less than the length of the child seat B and the adult seat C. The width of the lid A is substantially the same as the width of the child seat B and the adult seat C. The child seat B and the adult seat C are hinged together at D at the rear of the toilet bowl G.

Figure 6:
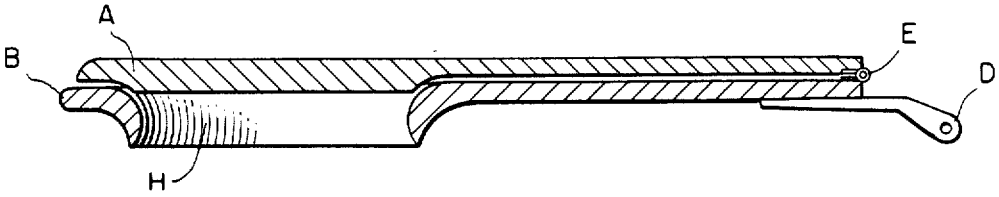
FIG. 6 is a cross-sectional view of another embodiment of the multiple toilet seat conversion assembly.

It should be noted that in another embodiment *shown in FIG. 6* the hinge E may be located at the rear most portion of the toilet bowl G such that the cover is substantially the same length as the child seat B and adult seat C.

The child seat D is characterized by the smaller opening to keep the child from falling in the toilet bowl G and is useful in training the child to use the toilet during the potty training period. Being substantially smaller in size, the child seat B is more comfortable and safer for the child than a conventional toilet seat, thus giving the attending parent or guardian relative peace of mind when their child is in the bath room alone.

A further benefit of the extended lip H of the child toilet seat B is that the lip H is so constructed and arranged as to prevent wetting of the adult seat C e.g. when the child, for lack of dexterity etc, inadvertently wets on the child seat B. The adult toilet seat C will remain dry since the extended lip portion H of the child seat B is substantially the same length as the extended lip J of the adult seat C when in the in-use or operative position, see FIG. 3.

Figure 5:
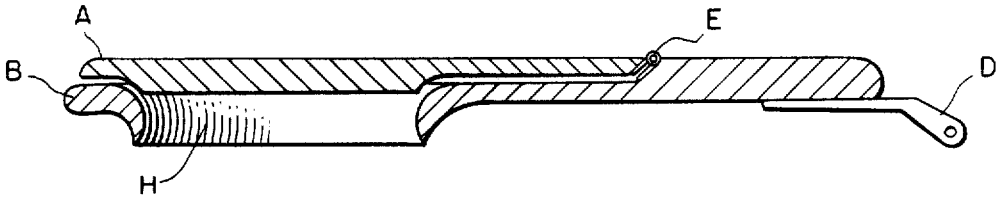
FIG. 5 is a cross-sectional view of the multiple toilet seat conversion assembly.
Figure 7:
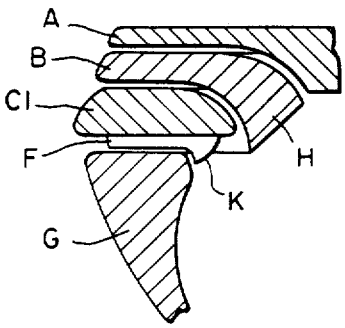
FIG. 7 is a side cutaway cross-sectional view of the front portion of the multiple seat conversion assembly in the closed position.
Figure 8:
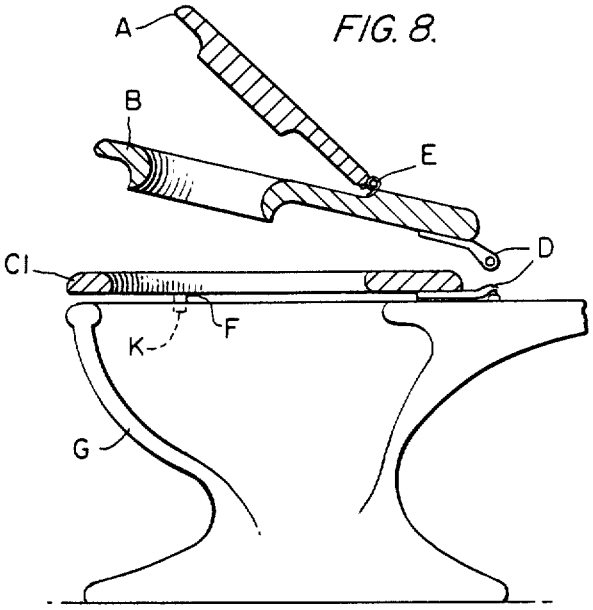
FIG. 8 is a cutaway side view of the multiple seat assembly emphasizing the location of the hinge assemblies.
Figure 9:
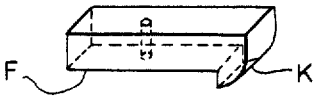
FIG. 9 is prospective view of the bumper used in conjunction with the multiple toilet bowl seat conversion assembly.

It can readily be seen that any toilet unit, commercial or residential, can be converted to a multiple toilet seat unit using my invention and the existing adult toilet seat C1 as shown in FIGS. [1 and 3] *7 and 8.* The conversion unit or assemblies are shown in FIGS. 5 and 6. Bumpers F *as shown in FIGS. 7, 8 and 9* may replace the conventional or existing bumpers. Note that bumper F has a contoured downwardly extending lip portion also which snugly fits the inside rim portion of the toilet bowl opening to further prevent side to side movement, see FIG. 7. Moreover, when the conversion unit is employed it should be noted that the contoured lip H extends downwardly beyond the inside edge portion of the existing toilet seat C1, see FIG. 7. This arrangement prevents the existing adult seat C1 from becoming wet when the child seat B is in use.

It will of course be understood by those skilled in the art that the particular embodiments of the invention here shown are by way of illustration only, and are meant to be in no way restrictive; therefore, numerous changes and the full use of equivalents resorted to without departing from the spirit and scope of the invention as defined by the appended claims.

I claim:

1. A multiple toilet seat assembly for use with a conventional toilet bowl unit having an opening comprising a cover, an adult seat having a central opening therein and a downwardly extending contoured lip portion closely surrounding the bowl opening, a child seat [intermediate the cover and] *mounted on top of* said adult seat, *said cover being mounted on top of the child seat,* said child seat having therein a central opening of a diameter substantially less than the diameter of the central opening of said adult seat, said child seat having a downwardly extending contoured lip portion of a length at least equal to the extension of the lip portion of the adult seat and of a size to [snuggly] *snugly* fit within the contoured lip portion of the adult seat to thereby prevent lateral side-to-side movement therebetween and to prevent the transfer of liquid from the child seat to the adult seat.

2. A multiple toilet seat assembly as defined in claim 1 wherein the seat assembly is hinged at the rear of the toilet bowl *unit* and [whereas] *wherein* the child seat and the adult seat share the same hinge assembly.

3. A multiple toilet seat assembly as defined in claim 2 wherein the cover is separately hinged to the child seat at the rear most portion thereof.

4. A multiple toilet seat assembly as defined in claim 2 wherein the cover is separately hinged to the child seat intermediate the rear most portion and the central opening thereof.

5. A multiple toilet seat conversion assembly for converting a conventional toilet bowl seat assembly to a multiple toilet bowl seat assembly comprising a child seat and a cover hinged thereto at the rear most portion thereof, said child seat having means associated therewith at the rear thereof for attachment to a conventional hinge assembly on a toilet bowl in conjunction with the conventional toilet seat, said child seat having a central opening of a lesser diameter than the diameter of the conventional toilet seat opening, said child toilet seat having a downwardly extending contoured lip portion, said lip portion being of a size to snugly fit within the central opening of the conventional toilet seat, and of a length to extend below the inside edge portion of the conventional toilet bowl seat to thereby prevent lateral side-to-side movement therebetween and to prevent the transfer of liquid from the child seat to the conventional toilet bowl seat.

6. A multiple toilet seat conversion assembly [as defined in claim 4 wherein the] *for converting a conventional toilet bowl seat assembly to a multiple toilet seat assembly comprising a child seat having a central opening therein and a* cover [is] hinged *thereto* intermediate the rear most portion of the child seat and the central opening thereof, *said child seat having means associated therewith at the rear thereof for attachment to a conventional hinge assembly on a toilet bowl in conjunction with the conventional toilet seat, said child seat having a central opening of a lesser diameter than the diameter of the conventional toilet seat opening, said child toilet seat having a downwardly extending contoured lip portion, said lip portion being of a size to snugly fit within the central opening of the conventional toilet seat, and of a length to extend below the inside edge portion of the conventional toilet bowl seat to thereby prevent lateral side-to-side movement therebetween and to prevent the transfer of liquid from the child seat to the conventional toilet bowl seat.*

7. A multiple toilet seat conversion assembly as defined in claim [4 or claim] 5 wherein *replacement* bumpers are provided [to replace the conventional bumpers] on the underside of the conventional toilet seat, said replacement bumpers having downwardly extending contoured lip portions of a size to [snuggly] *snugly* fit and closely engage the inside edge of the toilet bowl rim portion to prevent lateral side-to-side movement of the conventional toilet bowl seat.

* * * * *